(12) United States Patent
Lu et al.

(10) Patent No.: US 7,794,849 B2
(45) Date of Patent: Sep. 14, 2010

(54) THERMOPLASTIC FILM STRUCTURES WITH A LOW MELTING POINT OUTER LAYER

(75) Inventors: Pang-Chia Lu, Pittsford, NY (US); Robert G. Peet, Pittsford, NY (US); Benoit Ambroise, Montmedy (FR); Linda Maria Van den Bossche, Zwijndrecht (BE); Nancy Nadine Vanderheyden, Langdorp (BE); François Bosch, Saint-Mard (BE); Jacques Moriau, Grand-Failly (FR); Lindsay J. Mendes, Rochester, NY (US); Syd R. Wright, Pittsford, NY (US)

(73) Assignee: ExxonMobil Oil Corporation, Irving, TX (US)

( * ) Notice: Subject to any disclaimer, the term of this patent is extended or adjusted under 35 U.S.C. 154(b) by 0 days.

(21) Appl. No.: 12/425,167

(22) Filed: Apr. 16, 2009

(65) Prior Publication Data

US 2009/0202848 A1    Aug. 13, 2009

Related U.S. Application Data

(60) Continuation of application No. 11/939,211, filed on Nov. 13, 2007, now abandoned, which is a division of application No. 10/308,702, filed on Dec. 3, 2002, now abandoned.

(51) Int. Cl.
*B32B 27/08* (2006.01)
(52) U.S. Cl. ........................................... 428/515
(58) Field of Classification Search ............... None
See application file for complete search history.

(56) References Cited

U.S. PATENT DOCUMENTS

| | | | |
|---|---|---|---|
| 2,759,913 A | 8/1956 | Hulse | |
| 3,285,766 A | 11/1966 | Barkis et al. | |
| 3,753,769 A | 8/1973 | Steiner | |
| 3,877,969 A | 4/1975 | Tatsumi et al. | |
| 3,925,591 A | 12/1975 | Breitenfellner et al. | |
| 4,147,827 A | 4/1979 | Breidt et al. | |
| 4,194,039 A | 3/1980 | Mueller | |
| 4,214,039 A | 7/1980 | Steiner et al. | |
| 4,223,115 A | 9/1980 | Zalucha et al. | |
| 4,308,189 A | 12/1981 | Moritani et al. | |
| 4,333,968 A | 6/1982 | Nahmias | |
| 4,377,616 A | 3/1983 | Ashcraft et al. | |
| 4,386,129 A | 5/1983 | Jacoby | |
| 4,421,823 A | 12/1983 | Theisen et al. | |
| 4,439,493 A | 3/1984 | Hein et al. | |
| 4,447,494 A | 5/1984 | Wagner, Jr. et al. | |
| 4,546,140 A | 10/1985 | Shih | |
| 4,565,739 A | 1/1986 | Clauson et al. | |
| 4,572,854 A | 2/1986 | Dallmann et al. | |
| 4,582,752 A | 4/1986 | Duncan | |
| 4,610,914 A | 9/1986 | Newsome | |
| 4,615,926 A | 10/1986 | Hsu et al. | |
| 4,629,657 A | 12/1986 | Gulati et al. | |
| 4,632,869 A | 12/1986 | Park et al. | |
| 4,652,489 A | 3/1987 | Crass et al. | |
| 4,677,017 A | 6/1987 | DeAntonis et al. | |
| 4,695,503 A | 9/1987 | Liu et al. | |
| 4,704,314 A | 11/1987 | Hsu et al. | |
| 4,716,061 A | 12/1987 | Winter | |
| 4,755,419 A | 7/1988 | Shah | |
| 4,758,462 A | 7/1988 | Park et al. | |
| 4,801,640 A | 1/1989 | Dallmann et al. | |
| 4,828,928 A | 5/1989 | Shah | |
| 4,853,602 A | 8/1989 | Hommes et al. | |
| 4,865,908 A | 9/1989 | Liu et al. | |
| 4,879,177 A | 11/1989 | Boice | |
| 4,886,698 A * | 12/1989 | Purdy | ........................ 428/213 |
| 4,906,517 A | 3/1990 | Akao et al. | |
| 4,927,689 A | 5/1990 | Markiewicz | |
| 4,938,683 A | 7/1990 | Boice | |
| 4,946,743 A | 8/1990 | Winter | |
| 4,961,992 A | 10/1990 | Balloni et al. | |
| 4,975,469 A | 12/1990 | Jacoby et al. | |
| 5,019,447 A | 5/1991 | Keller | |
| 5,023,143 A | 6/1991 | Nelson | |
| 5,057,177 A | 10/1991 | Balloni et al. | |
| 5,064,716 A | 11/1991 | Chou et al. | |
| 5,126,197 A | 6/1992 | Schinkel et al. | |
| 5,128,205 A | 7/1992 | Butler | |
| 5,134,174 A | 7/1992 | Xu et al. | |
| 5,151,309 A | 9/1992 | Dollinger | |
| 5,169,712 A | 12/1992 | Tapp | |
| 5,176,953 A | 1/1993 | Jacoby et al. | |
| 5,194,324 A | 3/1993 | Poirier | |
| 5,209,972 A | 5/1993 | Super et al. | |

(Continued)

FOREIGN PATENT DOCUMENTS

CN    1131611    9/1996

(Continued)

OTHER PUBLICATIONS

F. Möller, Houben-Weyl, vol. 11/1 (1957), pp. 277-280.

*Primary Examiner*—Sheeba Ahmed
(74) *Attorney, Agent, or Firm*—Xiaobing Feng; Robert L. Abdon

(57) ABSTRACT

A film structure including at least a base layer containing a thermoplastic polymer and at least an outer layer containing a low melting point polymer. Methods of manufacturing the film structure, including the steps of coextruding melts corresponding to the individual layers of the film structure through a die and thereafter: simultaneously biaxially stretching the coextruded film sheet; or sequentially biaxially stretching the coextruded film sheet, wherein the machine-direction orientation (MDO) is performed with a radiant-heated MDO stretcher. An extrusion-coated film structure exhibiting strong bond adhesion, and a method of manufacturing the same are also provided.

20 Claims, No Drawings

U.S. PATENT DOCUMENTS

| | | | |
|---|---|---|---|
| 5,230,963 | A | 7/1993 | Knoerzer |
| 5,231,126 | A | 7/1993 | Shi et al. |
| 5,236,963 | A | 8/1993 | Jacoby et al. |
| 5,254,631 | A | 10/1993 | Yamamoto et al. |
| 5,296,530 | A | 3/1994 | Bors et al. |
| 5,310,584 | A | 5/1994 | Jacoby et al. |
| 5,317,035 | A | 5/1994 | Jacoby et al. |
| 5,380,587 | A | 1/1995 | Musclow et al. |
| 5,382,473 | A | 1/1995 | Musclow et al. |
| 5,407,611 | A | 4/1995 | Wilhoit et al. |
| 5,407,751 | A | 4/1995 | Genske et al. |
| 5,468,440 | A | 11/1995 | McAlpin et al. |
| 5,491,188 | A | 2/1996 | Ikeda et al. |
| 5,498,659 | A | 3/1996 | Esser |
| 5,516,475 | A | 5/1996 | Wilson |
| 5,521,266 | A | 5/1996 | Lau |
| 5,525,662 | A | 6/1996 | Lavoie et al. |
| 5,529,834 | A | 6/1996 | Tsai et al. |
| 5,547,764 | A | 8/1996 | Blais et al. |
| 5,585,193 | A | 12/1996 | Josephy et al. |
| 5,591,530 | A | 1/1997 | Warner et al. |
| 5,594,070 | A | 1/1997 | Jacoby et al. |
| 5,617,707 | A | 4/1997 | Simmons |
| 5,627,226 | A | 5/1997 | Lustiger et al. |
| 5,662,985 | A | 9/1997 | Jensen et al. |
| 5,667,902 | A | 9/1997 | Brew et al. |
| 5,681,922 | A | 10/1997 | Wolfschwenger et al. |
| 5,716,715 | A | 2/1998 | Degrassi et al. |
| 5,716,998 | A | 2/1998 | Munakata et al. |
| 5,725,962 | A | 3/1998 | Bader et al. |
| 5,733,615 | A | 3/1998 | Rackovan et al. |
| 5,753,363 | A | 5/1998 | Bader et al. |
| 5,789,123 | A | 8/1998 | Cleckner et al. |
| 5,811,121 | A | 9/1998 | Wu et al. |
| 5,811,185 | A | 9/1998 | Schreck et al. |
| 5,858,552 | A | 1/1999 | Bader et al. |
| 5,885,721 | A | 3/1999 | Su et al. |
| 5,891,555 | A | 4/1999 | O'Brien |
| 5,895,694 | A | 4/1999 | Zavadsky et al. |
| 5,919,547 | A | 7/1999 | Kocher et al. |
| 5,972,496 | A | 10/1999 | Bader et al. |
| 6,004,682 | A | 12/1999 | Rackovan et al. |
| 6,005,034 | A | 12/1999 | Hayashida et al. |
| 6,025,059 | A | 2/2000 | McGee et al. |
| 6,033,758 | A | 3/2000 | Kocher et al. |
| 6,072,005 | A | 6/2000 | Kobylivker et al. |
| 6,087,015 | A | 7/2000 | Cretekos et al. |
| 6,177,144 | B1 | 1/2001 | Kranig et al. |
| 6,183,856 | B1 | 2/2001 | Amon |
| 6,194,060 | B1 | 2/2001 | Amon et al. |
| 6,218,013 | B1 | 4/2001 | Wood et al. |
| 6,231,975 | B1 | 5/2001 | Kong et al. |
| 6,235,823 | B1 | 5/2001 | Ikeda et al. |
| 6,248,442 | B1 | 6/2001 | Kong et al. |
| 6,287,700 | B1 | 9/2001 | Kong et al. |
| 6,297,328 | B1 | 10/2001 | Collins et al. |
| 6,303,233 | B1 | 10/2001 | Amon et al. |
| 6,316,067 | B1 | 11/2001 | Edwards et al. |
| 6,368,742 | B2 | 4/2002 | Fisher et al. |
| 6,444,301 | B1 | 9/2002 | Davidson et al. |
| 6,558,808 | B1 | 5/2003 | Dries et al. |
| 6,797,778 | B2 | 9/2004 | Reichelt et al. |

FOREIGN PATENT DOCUMENTS

| | | |
|---|---|---|
| CN | 1282750 | 2/2001 |
| DE | 3610644 | 10/1986 |
| DE | 4420991 | 12/1995 |
| EP | 0695630 | 2/1996 |
| EP | 0 790 275 | 8/1997 |
| EP | 0 589 033 | 3/1998 |
| EP | 0668157 | 8/1998 |
| EP | 0 865 910 | 9/1998 |
| EP | 0 865 911 | 9/1998 |
| EP | 0 865 912 | 9/1998 |
| EP | 0 865 913 | 9/1998 |
| EP | 0 865 914 | 9/1998 |
| EP | 0 887 375 | 12/1998 |
| EP | 0 962 489 | 12/1999 |
| EP | 0 682 066 | 1/2002 |
| JP | 50104282 A | 8/1975 |
| JP | 62-195030 | 8/1987 |
| JP | 03-166234 | 7/1991 |
| JP | 03-187742 | 8/1991 |
| JP | 03-187746 | 8/1991 |
| JP | 04-122736 | 4/1992 |
| JP | 05-255551 | 10/1993 |
| JP | 07-148837 | 6/1995 |
| JP | 07-149967 | 6/1995 |
| JP | 08-067760 | 3/1996 |
| JP | 08-142286 | 6/1996 |
| JP | 08-183873 | 7/1996 |
| JP | 09-176352 | 7/1997 |
| JP | 09-194650 | 7/1997 |
| WO | WO 95/30708 | 11/1995 |
| WO | WO 97/10300 | 3/1997 |
| WO | WO 97/11115 | 3/1997 |
| WO | WO 97/22470 | 6/1997 |
| WO | WO 98/37140 | 8/1998 |
| WO | WO 01/98372 | 12/2001 |
| WO | WO 01/98409 | 12/2001 |
| ZA | ZA 970523 | 1/1997 |

\* cited by examiner

THERMOPLASTIC FILM STRUCTURES WITH A LOW MELTING POINT OUTER LAYER

CROSS REFERENCE TO RELATED APPLICATIONS

This application is a continuation of Ser. No. 11/939,211, filed Nov. 13, 2007, now abandoned, which is a divisional of Ser. No. 10/308,702, filed on Dec. 3, 2002, now abandoned, the disclosures of which are fully incorporated herein by reference

BACKGROUND OF THE INVENTION

The invention relates to multilayer thermoplastic film structures comprising at least one low melting point outer layer, and methods of manufacturing multilayer thermoplastic film structures comprising at least one low melting point outer layer.

Thermoplastic film structures are used in a wide variety of applications. Of the many different types of thermoplastic film structures, so-called oriented polypropylene (OPP) film structures, including biaxially oriented polypropylene (BOPP) film structures, which comprise at least one polypropylene-containing layer, are a very popular choice. OPP film structures possess excellent optical and mechanical characteristics, in addition to excellent barrier characteristics, e.g. moisture-barrier characteristics. OPP film structures, however, are not ideal in every respect.

For example, packaging applications, lamination applications, and metal adhesion applications are just some examples of the wide variety of applications in which thermoplastic film structures may be employed. For many packaging applications, the film structure must exhibit good sealing characteristics. For lamination applications, the film structure must achieve strong lamination bonds with the substrate to which it is being laminated. The metal layer of a metallized film structure must strongly adhere to the metallized layer of the film structure.

The extension of unmodified OPP film structures into packaging, lamination, and metal adhesion applications has been somewhat hampered by the difficulties associated with providing an OPP film structure that possesses: adequate heat-seal characteristics over a wide temperature range for packaging applications; adequate lamination bond strengths for lamination applications; or adequate metal adhesion for metallized film structures.

One solution has been to apply a coating having excellent heat-sealing, laminating, and/or metallizing characteristics onto an outer surface of an OPP film structure. An example of such a coating is a coating comprising a low melting point polymer.

According to one approach, a coating comprising a low melting point polymer is applied onto an outer surface of a polypropylene-containing film structure via an off-line coating process. For example, if the goal is to provide a biaxially oriented film structure having a coating on an outer surface thereof, an off-line coating process would apply the coating to the film structure after the film structure has been formed and oriented in both the machine and transverse directions. Off-line coating, however, can be extremely costly, requiring expensive equipment, such as drying ovens, solvent recovery systems, and the like.

According to a different approach, a coating comprising a low melting point polymer may be applied onto an outer surface of a polypropylene-containing film structure via an in-line extrusion coating process. In an in-line extrusion coating process, which may be used in conjunction with a sequential tenter frame orienter, a coating comprising a low melting point polymer is applied onto an outer surface of a polypropylene-containing film structure after the film structure has been formed and then oriented in the machine-direction, but before the film structure has been oriented in the transverse direction.

Regardless of whether an in-line or off-line coating technique is employed, the bond adhesion obtained between the polypropylene-containing layer and certain low melting point polymers that may serve as the coating, such as an ethylene-vinyl acetate (EVA) copolymer, may be less than adequate.

One method to improve bond strength is to corona-treat the substrate before extrusion coating the, e.g. EVA copolymer, thereon, or to ozone-treat the, e.g., EVA copolymer, before it contacts the substrate. Bond strength, however, is not always sufficient with either of these methods, and, furthermore, odor and corrosiveness are issues with ozone.

A reliable method to achieve high bond adhesion is to apply a primer layer between the substrate and the low melting point coating. Examples of suitable primers include imine-type, water-based primers and polyurethane-type primers. The application of a primer, however, makes the process (i) more complicated, because the primer solution has to be prepared and diluted, and (ii) more expensive, because the drying time for the primer limits the coating speed.

It would be advantageous to be able to provide, without the need for primer, a film structure exhibiting good bond adhesion between an extrusion-coated, low melting point polymer, such as an EVA copolymer coating, and the substrate to which the coating is applied.

In addition, it must be noted that via off-line coating, a film structure is provided wherein the low melting point coating has not at all been oriented. Via in-line extrusion coating, a film structure is provided wherein the low melting point coating has been oriented in only one direction, i.e., the transverse direction.

Attempts to manufacture a coextruded, biaxially oriented film structure comprising at least a polypropylene-containing base layer and an outer layer comprising a low melting point polymer have been hampered by the machine-direction orientation step in conventional methods of manufacturing biaxially oriented film structures. Specifically, the machine-direction orientation step may require machine-direction orientation (MDO) roll temperatures above about 220° F. (104° C.) in order to properly stretch the base layer. Therefore, a low melting point polymer may not be coextruded and machine-direction oriented by such a method because a low melting point polymer that contacts MDO rolls at such temperatures tends to disadvantageously stick to the MDO rolls. Other complications arising from contacting a low melting point polymer outer layer with relatively high temperature MDO rolls include residue build-up, optical defects, and the potential for forming holes in the film sheets that leads to breaks and production interruption.

It would therefore be advantageous to be able to coextrude and biaxially orient a film structure comprising at least a polypropylene-containing base layer and an outer layer comprising a low melting point polymer.

SUMMARY OF THE INVENTION

There is provided a coextruded, biaxially oriented film structure comprising at least a base layer comprising a thermoplastic polymer and at least an outer layer comprising a low melting point polymer. In certain embodiments of the invention, the low melting point polymer is selected from the group consisting of ethylene plastomers, ethylene-vinyl acetate (EVA) copolymers, ethylene-acrylic acid (EAA) copolymers or terpolymers, and blends thereof.

There is also provided a method of manufacturing a coextruded, biaxially oriented film structure comprising at least a base layer comprising a thermoplastic polymer and at least an outer layer comprising a low melting point polymer. In certain embodiments, the method comprises the steps of coextruding melts corresponding to the individual layers of the film structure through a die and thereafter simultaneously biaxially stretching the coextruded film sheet. In other embodiments, the method comprises the steps of coextruding melts corresponding to the individual layers of the film structure through a die and thereafter sequentially biaxially stretching the coextruded film sheet, wherein the machine-direction orientation (MDO) is performed with a radiant-heated MDO stretcher.

Additionally, there is provided a film structure comprising at least a base layer comprising a propylene polymer, an intermediate layer comprising an ethylene polymer on one side of the base layer, and a first outer layer comprising a low melting point polymer, such as a low melting point polymer comprising an ethylene-vinyl acetate (EVA) copolymer, on a side of the intermediate layer opposite the base layer. This film structure does not comprise a primer between the base layer and intermediate layer or between the intermediate layer and first outer layer.

DETAILED DESCRIPTION OF THE INVENTION

The film structure comprises a base layer. The base layer comprises a polymeric matrix comprising any of the film-forming thermoplastic polymers. A polyolefin having a melting point, for example, of at least about 302° F. (150° C.) and up to, for example, about 332.6° F. (167° C.), represents one example of a suitable film-forming polymer for forming the polymeric matrix of the base layer. If the film-forming thermoplastic polymer of the base layer is a polyolefin, the polyolefin preferably has a relatively high degree of crystallinity.

A particularly desirable polyolefin that may be used as the film-forming polymer is an isotactic propylene homopolymer having (i) an isotacticity of from about 89 to 99% (as measured by $^{13}$C NMR spectroscopy using meso pentads), (ii) a melting point of from about 311° F. (155° C.) to about 329° F. (165° C.), and (iii) a melt flow rate of from about 0.5 to about 15 g/10 minutes (as measured according to ASTM D1238). The isotactic propylene polymer may be produced by using Ziegler-Natta or metallocene catalysts. Metallocene-catalyzed isotactic polypropylenes made developmentally or commercially are EOD 96-21 and EOD 97-09, from Fina Oil and Chemical Co., EXPP-129, from ExxonMobil Chemical Co., and Novalen M, from BASF GmbH., among others.

In certain embodiments that comprise a base layer comprising propylene homopolymer, there may be added to the base layer from 0.0002 to 8 wt %, based on the weight of polypropylene, more preferably from 0.005 to 2 wt %, e.g. from 0.01 to 2 wt %, of a beta nucleator. Any type of beta nucleator may be employed, including two-component beta nucleators. Alternatively, a base layer of a film structure according to the present invention may not comprise any beta-nucleator.

Other suitable film-forming polymers that may be used to form the polymeric matrix of the base layer include, but are not limited to, syndiotactic polypropylene, ethylene-propylene copolymers, ethylene-propylene-butene-1 terpolymers, butylene-ethylene copolymers, functionally grafted polymers, blends of any of the foregoing polymers, etc.

Although it is preferred for the film-forming polymer of the base layer to comprise any of the propylene homopolymers, copolymers, or terpolymers described above, in an alternative embodiment, the film-forming polymer of the base layer is an ethylene copolymer or an ethylene homopolymer, such as high density polyethylene (HDPE), linear low density polyethylene (LLDPE), very low density polyethylene (VLDPE), low density polyethylene (LDPE), or ethylene plastomer.

HDPE has either no or moderate levels of long-chain branching and a density of, for example, from about 0.941 g/cm$^3$ or higher, e.g., from about 0.952 g/cm$^3$ to about 0.968 g/cm$^3$, a melting point of, for example, from about 266° F. to about 299° F. (from about 130° C. to about 148° C.), and a melt index of from less than 1 to 50 g/10 min, e.g. from 1 to 10 g/10 min (as measured according to ASTM D1238).

LLDPE has either no or moderate levels of long-chain branching and typically has a melt index of from less than 1 to 50 g/10 min, e.g. from 1 to 10 g/10 min (as measured according to ASTM D1238) and a density in the range of from 0.910 to 0.940 g/cm$^3$, preferably from 0.915 to 0.928 g/cm$^3$.

VLDPE, which is sometimes referred to as ultra low density polyethylene (ULDPE), is a very low density polyethylene with either no or moderate levels of long-chain branching and typically has a density at or below 0.915 g/cm$^3$, e.g., from about 0.860 to about 0.910 g/cm$^3$ and a melt index of from less than 1 to 50 g/10 min, e.g. from 1 to 20 g/10 min (as measured according to ASTM D1238).

HDPE, LLDPE, and VLDPE may be produced via catalytic polymerization using a Ziegler-Natta catalyst or a metallocene or other single-site catalyst in a gas-phase, solution, or slurry process. They may be derived solely from ethylene or from ethylene together with other higher comonomers, such as butene-1, hexene-1 or octene-1. When VLDPE is produced using a metallocene or other single-site catalyst, it is commonly referred to as a type of plastomer.

LDPE is highly branched and typically has a density in the range of from 0.912 g/cm$^3$ to 0.94 g/cm$^3$, e.g. from 0.915 g/cm$^3$ to 0.928 g/cm$^3$, and a melt index of from less than 1 to 50 g/10 min, e.g., from 1 to 10 g/10 min (as measured according to ASTM D1238). LDPE may be produced in a high pressure process using free-radical initiators. LDPE polymerized at high pressure is sometimes referred to as high-pressure polyethylene.

If it is desired to produce an opaque film structure, a cavitating agent(s) can be dispersed within the polymeric matrix of the base layer. A suitable cavitating agent(s) includes any organic or inorganic material that is incompatible with (the term "incompatible" is used in the sense that the materials are two distinct phases), and has a higher melting point than, the film-forming polymer of the base layer, at least at the orientation temperature. For example, the cavitating agent(s) may be any of those described in U.S. Pat. Nos. 4,377,616 and 4,632,869, the entire disclosures of which are incorporated herein by reference. Specific examples of the cavitating agent(s) include polybutylene terephthalate (PBT), nylon, an acrylic resin, an ethylene-norborene copolymer, solid or hollow preformed glass spheres, metal beads or spheres, ceramic spheres, calcium carbonate, and combinations thereof. When the base layer comprising a cavitating agent(s) is subjected to uniaxial or biaxial orientation, a cavity forms, providing a film having an opaque appearance.

The particle size of the cavitating agent(s) may be, for example, from about 0.1 micron to about 10 microns, more preferably from about 0.2 micron to about 2 microns. The cavitating agent(s) may be of any desired shape. For example, the cavitating agent(s) may be substantially spherical. The cavitating agent(s) may be present in the base layer in an amount of less than 30 wt %, for example from 2 wt % to 20 wt %, e.g., from 5 wt % to 10 wt %, based on the total weight of the base layer.

The cavitating agent(s) may be dispersed within the polymeric matrix of the base layer by blending the cavitating agent(s) and the film-forming polymer that provides the polymeric matrix at a temperature above the melting point of the film-forming polymer. This blending may take place in an extruder, such as a co-rotating, intermeshing twin screw extruder.

To preserve the structural integrity of the base layer, a thin layer of the film-forming polymer of the base layer, without the cavitating agent(s), may be coextruded on one or both sides of the film-forming polymer of the base layer. In this case, the total of the cavitating agent(s)-containing layer and the non-cavitating agent(s)-containing layer(s) may be considered the overall base layer of the film.

The base layer may also comprise an opacifying agent(s). Examples of the opacifying agent(s) include iron oxide, carbon black, titanium dioxide, talc, and combinations thereof. The opacifying agent(s) may be present in the base layer in an amount of from 1 to 15 wt %, for example from 1 to 8 wt %, e.g. from about 2 to about 4 wt %, based on the total weight of the base layer. Aluminum is another example of an opacifying agent that may be used in the base layer of the present film structure. Aluminum may be included in the base layer as an opacifying agent in an amount of from 0.01 to 1.0 wt %, e.g., from about 0.25 to about 0.85 wt %, based on the total weight of the base layer.

The base layer may further comprise one or more hydrocarbon resins. The hydrocarbon resin(s) may be present in the base layer in a total amount of from 1 wt % to 15 wt %, for example from 1 wt % to 12 wt %, e.g., from 2 wt % to 6 wt %, based upon the total weight of the base layer.

The hydrocarbon resin(s) may be a low molecular weight hydrocarbon which is compatible with the film-forming polymer of the base layer. The hydrocarbon resin(s) may, optionally, be hydrogenated. The hydrocarbon resin(s) may have a number average molecular weight of less than 5,000, for example less than 2,000, e.g. from 500 to 1,000. The resin(s) may be natural or synthetic and may have a softening point in the range of from 140° F. to 356° F. (60° C. to 180° C.). A specific example of a hydrocarbon resin that may be contained in the present base layer is any of the hydrocarbon resins disclosed in U.S. Pat. No. 5,667,902 to Brew, et al., which is incorporated herein by reference. Specific examples include, but are not limited to, petroleum resins, terpene resins, styrene resins, and cyclopentadiene resins. Examples of commercially available hydrogenated resins include PICCOLYTE, REGALREZ, and REGALITE, each of which are available from Hercules Corp., ESCOREZ, available from ExxonMobil Chemical Co., and ARKON, available from Arakawa Chemical Co.

A saturated alicyclic resin is an additional example of a hydrocarbon resin that may be included in the base layer of the present film structure. Saturated alicyclic resins have a softening point in the range of from 185° F. to 284° F. (85° C. to 140° C.), for example from 212° F. to 284° F. (100° C. to 140° C.), as measured by the ring and ball technique. An example of a commercially available saturated alicyclic resin is ARKON-P, available from Arakawa Forest Chemical Industries, Ltd. Of Japan.

The base layer of the film structure is of sufficient thickness to provide bulk properties, such as barrier, stiffness, etc. that are desired for product protection and good performance on packaging equipment. In preferred embodiments, the thickness of the base layer ranges from about 50% to about 99% of the entire thickness of the film structure.

The film structure comprises at least a first outer layer. The first outer layer comprises a low melting point polymer. Preferably, the low melting point polymer has a melting point of not more than about 230° F. (110° C.), e.g. from about 113° F. to about 230° F. (45° C. to about 110° C.). For more amorphous polymers that may not have a well-defined crystalline melting point, suitable low melting point polymers include those that have a Vicat softening point of not more than about 85° C. (185° F.).

Although the low melting point polymer to be employed as a first outer layer of the present film structure may be any of the low melting materials known in the art, in particularly preferred embodiments of the invention, the first outer layer comprises a low melting point polymer selected from the group consisting of very low density polyethylene (VLDPE), ethylene plastomers, ethylene-vinyl acetate (EVA) copolymers, ethylene-acrylic acid (EAA) or ethylene-methacrylic acid (EMA) copolymers or terpolymers, ethylene homopolymers or ethylene copolymers (such as LDPE, LLDPE (Ziegler-Natta or metallocene-catalyzed)), and blends thereof.

VLDPE, or ultra low density polyethylene (ULDPE), is a particular type of film-forming polyolefin that may be employed as the first outer layer of the present invention. An example of a VLDPE is an ethylene-based hexane copolymer that has a density of from about 0.860 g/cm$^3$ to about 0.910 g/cm$^3$, e.g., from about 0.890 g/cm$^3$ to about 0.909 g/cm$^3$, and a melt index of from about 3 to about 17 g/10 minutes (as measured according to ASTM D1238). As mentioned earlier, when VLDPE is produced using a metallocene or other single-site catalyst, it is commonly referred to as a type of plastomer. Plastomers are commercially available from ExxonMobil Chemical Company, under the trademarks EXACT PLASTOMER 3139 (melt index=7.5 g/10 minutes (ASTM D1238); density=0.900 g/cm$^3$) and EXACT 3040 (melt index=16.5 g/10 minutes (ASTM D1238; density=0.900 g/cm$^3$). Other examples of suitable VLDPE resins include, but are not limited to, product No. 1137 (melt index=8 g/10 minutes; density=0.906 g/cm$^3$) from Union Carbide, Danbury, Conn. and product No. XPR 0545-33260 46L (melt index=3.3 g/10 minutes; density=0.908 g/cm$^3$) from Dow Chemical Company, Midland, Mich.

In general, ethylene plastomers are film-forming plastomers that are produced via well known single-site (including metallocene) catalyst technology, which permits very precise control of (i) the comonomer incorporated into an ethylene polymer and (ii) the molecular weight distribution. Ethylene plastomers may be copolymers of ethylene with higher α-olefins having from 3 to about 10 carbon atoms, such as, for example, 1-butene, 1-hexene and 1-octene. Preferred ethylene plastomers for use as the film-forming plastomer of the first outer layer have a density range of from about 0.865 to 0.889 g/cm$^3$ and a peak melting point range of from about 120° F. to about 185° F. (from about 49° C. to about 85° C.). Ethylene plastomers are commercially available from ExxonMobil Chemical Company, under the trademark EXACT. Ethylene plastomers are also commercially available from Dow Plastics, Dow U.S.A., Midland, Mich., under the trademark ENGAGE, e.g., ENGAGE EG8100 (an ethylene/1-octene copolymer), or AFFINITY.

Ethylene-vinyl acetate copolymers are film-forming copolymers having from about 1 wt % to about 45 wt % of vinyl acetate comonomer content, and the remainder of ethylene. A particularly preferred range of the vinyl acetate comonomer content is from about 5 wt % up to about 30 wt %, e.g., from about 6 wt % up to about 21 wt %. Preferably, the ethylene-vinyl acetate copolymer has a melt index of from about 0.5 to about 28 g/10 min (ASTM D1238; 190° C./2.16 kg) and a peak melting point range of from about 113° F. to about 212° F. (from about 45° C. to about 100° C.). Ethylene-vinyl acetate copolymers are commercially available from, for example, ExxonMobil Chemical Company under the trade name ESCORENE ULTRA.

Ethylene acrylic acid (EAA) and ethylene methacrylic acid (EMAA) copolymers and terpolymers are film-forming copolymers and terpolymers that comprise (i) polyethylene, (ii) acrylic acid, methacrylic acid, or mixtures thereof, and/or (iii) alkyl acrylate, alkyl methacrylate, or mixtures thereof, e.g. ethylene-methacrylate copolymer, ethylene-butyl acrylate copolymer, ethylene-ethyl acrylate copolymer, etc. For example, an ethylene acid terpolymer resin composition may comprise: (i) from about 0.5 wt % to about 12 wt % of acrylic acid, methacrylic acid, or mixtures thereof; (ii) up to about 20 wt % of alkyl acrylate, alkyl methacrylate, or mixtures thereof, preferably from about 6 wt % to about 20 wt % of alkyl acrylate, alkyl methacrylate, or mixtures thereof; and (iii) the remainder of polyethylene. Preferred EAA and EMAA copolymers and terpolymers for use as the film-forming polymers of the first outer layer have a melting point range of from about 140° F. to about 212° F. (from about 60° C. to about 100° C.). Examples of EAA and EMAA copolymers and terpolymers include ESCOR 5000 (melt index=8 g/10 minutes (ASTM D1238); density=0.931 g/cm$^3$; 6 wt % acrylic acid), ESCOR 5050 (melt index=8 g/10 minutes (ASTM D1238); density=0.936 g/cm$^3$; 9 wt % acrylic acid), and ESCOR 5100 (melt index=8 g/10 minutes (ASTM D1238); density=0.940 g/cm$^3$; 11 wt % acrylic acid), which are commercially available ethylene-acrylic acid copolymers, and ESCOR AT-310 (melt index=6 g/10 minutes (ASTM D1238); density=0.943 g/cm$^3$) and ESCOR AT-320 (melt index=5 g/10 minutes (ASTM D1238); density=0.953 g/cm$^3$), which are commercially available acid terpolymers. ESCOR resins are commercially available from ExxonMobil Chemical Company.

The film structure may comprise the first outer layer applied directly on one side of the base layer, or the film structure may comprise one or more intermediate, or tie, layers between the base layer and the first outer layer.

The film structure may additionally comprise one or more layers on the side of the base layer opposite the side of the first outer layer. For example, the film structure may comprise a second outer layer applied directly on the side of the base layer opposite the first outer layer, or the film structure may comprise one or more intermediate, or tie, layers between the base layer and second outer layer.

The second outer layer, if present, comprises a polymeric matrix comprising a film-forming polymer.

In one embodiment of the invention, the film-forming polymer of the second outer layer is the same as the film-forming polymer of the first outer layer, i.e., the second outer layer is also a low melting point polymer.

For other embodiments of the invention, the film-forming polymer used to form the polymeric matrix of the second outer layer may be chosen from a list of materials including, but not limited to, polyolefins, such as polypropylene, syndiotactic polypropylene, low density polyethylene (LDPE), linear low density polyethylene (LLDPE), medium density polyethylene (MDPE), high density polyethylene (HDPE), ethylene copolymers, such as ethylene-vinyl acetate and ethylene-vinyl alcohol copolymers, nylons, polymers grafted with functional groups (including, but not limited to, maleic and himic anhydride), blends of these, etc. MDPE has a density in the range of from about 0.926 g/cm$^3$ to about 0.940 g/cm$^3$.

For certain embodiments, it may be desirable for the second outer layer to be a heat-seal layer. For example, it may be desirable for the film-forming polymer of the second outer layer to comprise polyolefinic copolymers, terpolymers, or blends thereof.

Suitable heat-seal copolymers include block or random copolymers of ethylene and propylene, butylene and propylene, and ethylene and butylene. A preferred copolymer is an ethylene-propylene (EP) random copolymer generally containing from about 2 to about 8 wt % ethylene, specifically from about 3 to about 7 wt % ethylene, the balance being made up of propylene. The copolymer may have a melt index at 446° F. (230° C.) generally ranging from about 2 to about 15 g/10 min (ASTM D1238), and preferably from about 3 to about 8 g/10 min. The crystalline melting point is usually from about 257° F. to about 302° F. (from about 125° C. to about 150° C.) and the number average molecular weight range is from about 25,000 to 100,000. The density will usually range from about 0.89 to about 0.92 g/cm$^3$. An example of a commercially available copolymer that may be used as the second outer layer is 7880 PP, available from CHISSO.

Suitable heat-seal terpolymers include ethylene-propylene-butene-1 terpolymers. A preferred terpolymer is an ethylene-propylene-butene-1 (EPB) terpolymer obtained from the random inter-polymerization of from about 1 to about 8 weight percent ethylene, preferably from about 3 to about 7 weight percent ethylene with from about 1 to about 10 weight percent butene-1, preferably from about 2 to about 8 weight percent butene-1 with propylene representing the balance. The foregoing EPB terpolymers may be characterized by a melt index at 446° F. (230° C.) of from about 2 to about 16 g/10 min (ASTM D1238), and advantageously from about 3 to about 7 g/10 min, a crystalline melting point of from about 212° F. to about 284° F. (from about 100° C. to about 140° C.), an average molecular weight of from about 25,000 to about 100,000 and a density within the range of from about 0.89 to about 0.92 g/cm$^3$. An example of a commercially available terpolymer that may be used as the second outer layer is XPM 7510, available from CHISSO.

If a blend of EPB terpolymer and EP copolymer is used as the second outer layer, the blend may contain from about 10 to about 90 weight percent EPB terpolymer and preferably from about 40 to about 60 weight percent EPB terpolymer, the balance being made up of EP copolymer.

According to additional embodiments of the invention, the outer surface of the second outer layer has a glossy appearance. This may be accomplished by several manners known in the art.

For example, a polymer that possesses high gloss optical characteristics when formed into a film may be specifically selected as the film-forming polymer of the second outer layer. Examples of such polymers are well known in the art, and include polyolefins, such as homopolymers of propylene or ethylene. Blends of film-forming polymers for the second outer layer may also be employed, provided that a combination of incompatible polymers is not employed. The presence of two or more incompatible polymers may negatively affect the gloss optical characteristics.

To further ensure that the film-forming polymer selected for the second outer layer will provide a glossy appearance, the level of gloss-impairing additives, especially certain slip additives, such as fatty amides, silicone oil, and certain antiblocking agents, added to the second outer layer may be controlled, or if necessary, kept at nil. In addition, or alternatively, to further enhance the glossy appearance of the film-forming polymer selected for the second outer layer, a particular coating, such as a high-gloss polyurethane coating, may be applied to the outer surface of the second outer layer.

According to still further embodiments of the invention, the outer surface of the second outer layer has a matte appearance. This may be accomplished by several manners known in the art. For example, a blend of two or more incompatible polymers may be employed as the film-forming polymers of the second outer layer, or a coating that imparts a haze may be applied to the outer surface of the second outer layer. U.S. Pat. No. 6,087,015 to Cretekos, et al., which is incorporated herein by reference, provides some specific example of matte surface layers.

The intermediate layer(s) that is optionally provided between the base layer and the first outer layer and/or between the base layer and the second outer layer comprises a polymeric matrix comprising a film-forming polymer. Suitable film-forming polymers for forming the polymeric matrix of the intermediate layer(s) include, but are not limited to, polyolefins, such as polypropylene, syndiotactic polypropylene, polypropylene copolymers, low density polyethylene (LDPE), linear low density polyethylene (LLDPE), medium density polyethylene (MDPE), high density polyethylene (HDPE), ethylene copolymers, nylons, polymers grafted with functional groups, blends of these, etc.

Although the thickness of the film structure, and the thicknesses of the individual layers of the film structure, are not critical, in certain embodiments, the film structure has a total thickness ranging from about 0.2 mil to about 5 mils, preferably from about 0.4 mil to about 2.5 mils. The thickness of the base layer preferably ranges from about 50% to about 99%, the thickness of each intermediate layer, if any, preferably ranges from 0% to 25%, and the thickness of each outer layer(s) preferably ranges from 1% to 15%, wherein, for each case, the example range is based on the entire thickness of the film structure. In certain embodiments, the thickness of the coated layer may be from about 30 to about 70%.

In order to modify or enhance certain properties of the film structure for specific end-uses, it is possible for one or more of the layers to contain appropriate additives in effective amounts. Preferred additives include, but are not limited to anti-blocks, anti-static agents, coefficient of friction (COF) modifiers, processing aids, colorants, clarifiers, ionomers and other additives known to those skilled in the art.

Thus, a film structure according to the present invention comprises at least a base layer comprising a thermoplastic polymer and at least a first outer layer comprising a low melting point polymer.

In contrast to related prior art film structures, however, each of the individual layers of a film structure prepared according to preferred embodiments of the present invention, including the base layer and first outer layer, are coextruded and biaxially oriented, for example, from about 1.5 to about 8 times in the machine direction and from about 2 to about 12 times in the transverse direction, e.g. from about 4 to about 6 times in the machine direction and from about 8 to about 10 times in the transverse direction.

In one preferred embodiment of the invention, melts corresponding to each of the individual layers of the film structure, including the first outer layer, are prepared and coextruded through a die, e.g., a flat-film die or slot die, quenched, and then the film sheet comprising the coextruded layers is subjected to a simultaneous biaxial orientation process in a machine direction that does not employ machine-direction orientation (MDO) rolls and a transverse direction. The result is a coextruded, biaxially oriented film structure wherein the low melting point polymer coextruded as the first outer layer of the film structure does not disadvantageously stick to any MDO rolls.

Specifically, simultaneous biaxial orientation may proceed on a line that utilizes linear motors to directly propel opposed pairs of tenter clips synchronously. A film sheet comprising each of the coextruded layers of the film structure to be produced may be primarily oriented by synchronously accelerating along a diverging path a multitude of directly opposed pairs of tenter clips holding the film sheet, thus achieving simultaneous biaxial orientation and providing the biaxially oriented film structure. In addition, secondary machine-direction orientation on the same tenter can be effected along a parallel, or substantially parallel, path subsequent to the diverging path by simultaneously accelerating the directly opposed pairs of tenter clips along some portion of the parallel path.

The use of linear motors to directly propel tenter clips to effect simultaneous biaxial stretching is further disclosed in U.S. Pat. No. 4,853,602 to Hommes, et al., the contents of which are incorporated herein by reference in their entirety.

There is also provided an alternative preferred embodiment that results in each of the individual layers of a film structure, including the first outer layer, being coextruded and biaxially oriented. According to this alternative preferred embodiment, melts corresponding to each of the individual layers of the film structure, including the first outer layer, are prepared and coextruded through a die, e.g. a flat-film die or slot die, quenched, and then the film sheet comprising the coextruded layers is subjected to a sequential biaxial orientation process in a machine direction that employs a radiant-heated MDO stretcher and in a transverse direction. The radiant-heated MDO stretcher allows a low melting point polymer to be coextruded as the first outer layer of a film structure without disadvantageously sticking to any MDO rolls.

Specifically, the machine-direction orienter in a sequential biaxial orientation line equipment is provided with a high-intensity radiant-heating section in a non-contacting free span between a last slow roll and a first fast roll. The surface of each of these rolls, as well as all other rolls in the MD orienter, is held at a temperature below the temperature at which the relatively low melting outer layer would stick to the roll.

In the non-contacting free span between the last slow roll and the first fast roll, a film leaves the last slow roll, passes in close proximity to a heater designed to heat the film to a desired high temperature, is MD oriented at the desired high temperature, and then passes directly onto the first fast roll, which is held at a temperature below the sticking point of the film to the surface of the roll. The film only stretches from the point that it reaches its highest temperature, which is at the exit of the radiant heater, to the point that the film touches onto the first fast roll. The length over which the film actually stretches, the stretch length or stretch gap, is related primarily to the distance between the end of the heater and the point at which film lays down on the first fast roll.

The overall length between the last slow roll and the first fast roll is essentially immaterial. In other words, within reasonable limits, there is no constraint on the size of the radiant heater unit.

A radiant heater may comprise a long quartz, glass, or ceramic tube that spans the entire width of the web passing through the MD orienter. Within this tube is a heating wire, such as Nichrome or Kanthal, etc. Typically this wire is spirally wound. Electrical power is supplied to the ends of these wires, such that the heating wire can reach a chosen temperature. The amount of electrical power, and the resulting wire temperature, is chosen to provide radiant energy at a preferred balance of the wave length most appropriate for the infra-red absorption spectra of the film being processed, the throughput of the film, the temperature increase desired within the film, and the radiant power of the wire at the temperature chosen.

If the wire temperature is held at a moderate heater wire temperature, for example, below about 1500° F., the heating wire can be open to the atmosphere and still retain an acceptable operating life. If a wire temperature above 1500° F. is desired, the wire typically is mounted within an evacuated vitreous glass bulb.

A radiant heater unit may comprise a chosen number of tubes. The number is chosen primarily based on throughput of the film passing the heater and the temperature rise desired. The total number of tubes and the distance between the last slow roll and the first fast roll is not critical in the control of the MD orientation step. It is preferred to minimize the distance from the exit end of the radiant heater unit to the first fast roll.

The slow roll section is run at a temperature just below the temperature that would cause the low melting point polymer of the first outer layer to disadvantageously stick to the roll surfaces. Although the exact temperature for the slow roll section may depend on the particular low melting point being employed as the first outer layer, a general range of temperatures for the slow roll section may be from about 175° F. to about 250° F. (from about 80° C. to about 121° C.).

The radiant-heater(s) raises the temperature of the film sheet comprising each of the coextruded layers of the film structure to be produced to a desired stretching temperature in the non-contacting free span. Although the specific stretching temperature may depend on the particular compositional make-up of the individual layers of the coextruded sheet, a general range of temperatures at which the non-contacting free span may be maintained is from about 195° F. to about 290° F. (from about 90° C. to about 143° C.).

From the point of its highest temperature at the exit from the radiant-heated non-contacting free span, the coextruded sheet would stretch in the machine direction until it reaches a comparatively cool first fast roll. Specifically, the first, and subsequent, fast rolls would be maintained at a temperature below the temperature that would cause the low melting point polymer of the first outer layer to disadvantageously stick to the roll surfaces. Although the exact temperature at which to maintain the fast rolls may depend on the particular low melting point polymer being employed as the first outer layer, a general range of temperatures for the fast roll section may be from about 175° F. to about 250° F. (from about 80° C. to about 121° C.).

From here, the machine-direction oriented film structure may proceed to the transverse-direction orientation section of the apparatus, thereafter resulting in a coextruded, biaxially oriented film structure wherein the low melting point polymer coextruded as the first outer layer of the film structure has not disadvantageously stuck to any MDO rolls.

As an example of how a film structure according to the present invention may be prepared by a radiant-heating MD orientation process, consider a two-layer, coextruded cast web comprising an isotactic polypropylene base layer and an outer layer of an acid terpolymer (ESCOR AT-310, having a melting point of 201° F. (94° C.)). The coextruded web may be passed through the slow roll section of a MD orienter held at a temperature of 195° F., without sticking. The coextruded web can then be heated to a temperature of 250° F. in close proximity to the radiant heater in the free span. The web, so heated, will then stretch, at, for example, 5 MDX, from the end of the radiant heater unit until it reaches the first fast roll, which is held at 195° F. Stretching ceases and the oriented film proceeds across the remaining MD rolls, at 195° F., and into the TD orienter. Thus, the utility of this invention has been shown for MD stretching an essentially isotactic polypropylene film at stretching temperatures necessary for isotactic polypropylene without running the film over rolls held at those same temperatures.

As would be readily understood by one of ordinary skill in the art, both the simultaneous stretching and radiant-heating embodiments work equally well, whether the film structure to be produced is limited to a base layer and first outer layer, or whether the film structure to be produced further comprises any of the additional layers disclosed herein, including one or more intermediate layers and/or a second outer layer.

One or both of the outer surfaces of the coextruded, biaxially oriented film structure, e.g. one or both of the first and second outer layers, or one or both of the first outer layer and the base layer where the film structure does not include a second outer layer, may be surface-treated. The surface treatment can be carried out by any method known in the art, including, but not limited to, corona discharge treatment, flame treatment, or plasma treatment. Although any of these techniques are effectively employed to surface-treat the outer layer(s), a particularly desirable method of treatment is the so-called corona treatment method, which comprises exposing the film surface to a high voltage corona discharge while passing the film between a pair of spaced electrodes. The surface of the outer layer(s) may be treated to a surface tension level of at least about 35 dynes/cm, e.g. from about 38 to 55 dynes/cm, in accordance with ASTM Standard D2578-84.

In addition, the outer surface of the side of the coextruded, biaxially oriented film structure opposite the first outer layer, e.g., the outer surface of the second outer layer, or the outer surface of the base layer where the film structure does not include a second outer layer, may have a coating applied thereto via, e.g., an off-line coating process. An appropriate coating includes, but is not limited to, an acrylic coating, such as those described in U.S. Pat. Nos. 3,753,769 and 4,865,908, both of which are incorporated herein by reference, an acrylonitrile coating, a polyvinylidene chloride (PVdC) coating, such as those described in U.S. Pat. Nos. 4,214,039, 4,447,494, 4,961,992, 5,019,447, and 5,057,177, all of which are incorporated herein by reference, a polyvinyl alcohol (PVOH) coating, a urethane coating, an epoxy coating, and blends thereof.

Examples of commercially available PVOH materials include VINOL 125, 99.3+% super hydrolyzed polyvinyl alcohol and VINOL 325, 98% hydrolyzed polyvinyl alcohol, each of which may be obtained from Air Products, Inc. For additional examples of PVOH coatings that may be used to coat the second outer layer, see, for example, U.S. Pat. Nos. 4,927,689, 5,230,963, and 5,547,764, which are incorporated herein by reference.

The coating may be applied in an amount such that there will be deposited upon drying a smooth, evenly distributed layer, generally on the order of from about 0.01 to about 1 mil thickness. Generally, the coating comprises 1 to 25 wt %, preferably 7 to 15 wt % of the entire coated film structure. The coating on the film structure is subsequently dried by hot air, radiant heat or by any other convenient means.

Prior to the application of the coating, the outer surface of the side of the coextruded, biaxially oriented film structure opposite the first outer layer may be primed with a primer material. An appropriate primer material includes, but is not limited to, a poly(ethyleneimine) primer and an epoxy primer.

The outer surface of the side of the coextruded, biaxially oriented film structure opposite the first outer layer, e.g., the outer surface of the second outer layer, the outer surface of the base layer where the film structure does not include a second outer layer, or the outer surface of the coating where a coating has been applied to that side of the film structure, may be metallized. Application of a metal coating layer may be accomplished by vacuum deposition, or any other metallization technique, such as electroplating or sputtering. The metal of the metal coating layer may be aluminum, or any other metal capable of being vacuum deposited, electroplated, or sputtered, such as, for example, gold, zinc, copper, or silver. The thickness of the deposited metal coating may be from about 5 to about 200 nanometers (nm), for example, from about 10 to 100 nm, e.g. from about 30 to about 80 nm.

While attention has been given to embodiments of the invention wherein each of the individual layers of the film structure to be prepared, including the base layer and first outer layer, are coextruded and biaxially oriented, in some instances it may be necessary to extrusion-coat (including monoextrusion coating and coextrusion coating) the first outer layer onto the base layer or onto an intermediate layer adjacent to the base layer. In particular, the first outer layer may be extrusion-coated onto the base layer or intermediate layer in an amount such that there will be deposited upon drying a smooth, evenly distributed layer, generally on the order of from about 0.01 to about 1 mil thickness. Generally, the coating comprises 1 to 25 wt %, preferably 7 to 15 wt % of the entire coated film structure. The coating on the film structure is subsequently dried by hot air, radiant heat or by any other convenient means.

If an off-line coating technique is used, a coating comprising the low melting point polymer, e.g. plastomer or EVA, to form the first outer layer is applied onto an outer surface of a film structure after the film structure has been formed and oriented. If an in-line extrusion coating process is used, a coating comprising the low melting point polymer to form the first outer layer is applied onto an outer surface of a film structure after the film structure has been formed and then oriented in the machine-direction, but before the film structure has been oriented in the transverse direction. Either way, the first outer layer is not coextruded and biaxially oriented with the other layers of the film structure.

It has been discovered that the bond adhesion obtained between a polypropylene-containing base layer and an extrusion-coated first outer layer, such as an extrusion-coated, low melting point polymer comprising an ethylene-vinyl acetate (EVA) copolymer, may be improved by providing at least one layer of an ethylene polymer on the outer surface of the polypropylene-containing base layer that is to have the first outer layer extrusion-coated thereon.

An advantage of providing this at least one ethylene layer is that a film structure prepared in this manner achieves strong bond adhesion between the extrusion-coated first outer layer and substrate, without the need for a primer between the propylene-containing base layer and ethylene layer(s) or between the ethylene layer(s) and extrusion-coated first outer layer. Besides eliminating the need for a primer, which can be relatively expensive, the process speed is no longer limited by the time required to dry the primer. In addition, bond adhesion may no longer depend on humidity, as most primers are water-sensitive, and no primer is needed.

In a preferred embodiment of a film structure comprising an extrusion-coated first outer layer, the base layer comprises a propylene polymer, such as any of the Ziegler-Natta- or metallocene-catalyzed propylene homopolymers, copolymers, or terpolymers described earlier. In a particularly preferred embodiment, the base layer is an isotactic propylene homopolymer. As for the ethylene polymer of the at least one layer of an ethylene polymer, it may be an ethylene homopolymer, copolymer, or terpolymer. If an ethylene copolymer or terpolymer is employed, the ethylene copolymer or terpolymer preferably comprises a predominant amount of ethylene comonomer content, e.g. above 50 weight percent.

Particularly preferred ethylene polymers for the at least one layer of an ethylene polymer are homopolymers of ethylene, such as low density polyethylene (LDPE), linear low density polyethylene (LLDPE), medium density polyethylene (MDPE), high density polyethylene (HDPE), and blends thereof. MDPE has a density in the range of from about 0.926 g/cm$^3$ to about 0.940 g/cm$^3$.

The provision of the at least one ethylene layer of an ethylene polymer on the outer surface of a polypropylene-containing base layer that is to have a first outer layer extrusion-coated thereon yields a film structure that achieves a minimum adhesion peel of at least 0.3 N/15 mm, for example, at least 0.5 N/15 mm, preferably at least 0.8 N/15 mm, e.g., at least 1.0 N/15 mm, wherein adhesion peel is measured and defined by ASTM D1876 by means of a T peel configuration. Importantly and surprisingly, film structures according to the invention achieve these minimum adhesion peel values without the need for a primer between the propylene-containing base layer and ethylene layer(s) or between the ethylene layer(s) and extrusion-coated first outer layer.

Whether each of the individual layers of the film structure to be prepared, including the base layer and first outer layer, are coextruded and biaxially oriented, or whether the first outer layer is extrusion-coated onto an outer surface of a film structure, the provision of a first outer layer of a low melting point polymer, e.g., plastomer or EVA, lends the film structure superior functionality. For example, for packaging applications, the first outer layer provides the film structure with excellent sealing characteristics. For lamination applications, the first outer layer allows the film structure to achieve strong lamination bonds with the substrate to which it is being laminated. In addition, the first outer layer allows the metal layer of a metallized film structure to strongly adhere to the film structure.

A film structure according to the invention may be used for low temperature seal, high speed packaging use, for low temperature over-lamination to paper or other plastic substrates, document lamination, "plastification," or for digital printing with selected surface chemistry.

In a particular application, the first outer layer of a film structure according to the invention is laminated onto a substrate. The substrate may be glass, plastic, ceramic, metal, textiles, electronics or wood. For example, the substrate may be another polymer film or laminate, a cellulosic web(s), e.g., numerous varieties of paper, such as corrugated paperboard, craft paper, glassine, and cartonboard, nonwoven tissue, e.g., spunbonded polyolefin fiber, melt-blown microfibers, etc.

In a preferred embodiment, a film structure according to the invention is laminated via the first outer layer as a protective film for an identification card or display system used for advertising, including signs, posters, pictures, etc.

While the lamination of a film structure to a substrate may employ a suitable adhesive, e.g., a hot melt adhesive, such as blends of HEVA, waxes and resins, a water-based adhesive, such as polyvinylidene chloride latex, etc., between the first outer layer and substrate, film structures prepared according to the present invention may be advantageously laminated by heat lamination.

Heat lamination, which uses heat and pressure to apply a lamination film onto a substrate, improves the durability of the substrate without the need for more expensive water-based lamination or environmentally unfriendly solvent-based lamination. Commercial heat laminators used for the lamination of film structures to paper substrates, such as cards, can be standalone machines in which a printed card is fed into the laminator where an overlay film is applied to the card. In this case, a film structure according to the present invention may advantageously be employed as the overlay film. Alternatively, the laminator may be integrated into a printer.

For other applications, the first outer layer of the film structure is metallized. Application of a metal coating layer to the first outer layer may be accomplished by vacuum deposition, or any other metallization technique, such as electroplating or sputtering. The metal of the metal coating layer may be aluminum, or any other metal capable of being vacuum deposited, electroplated, or sputtered, such as, for example, gold, zinc, copper, or silver. The thickness of the deposited metal coating may be from about 5 to about 200 nanometers (nm), for example, from about 10 to 100 nm, e.g. from about 30 to about 80 nm.

The following example, which further illustrates an embodiment of the invention, compares a primerless film structure prepared according to the invention with a commercially available film for document plastification.

EXAMPLE

A primerless film structure according to one embodiment of the present invention was produced on a pilot line, and compared to a conventional three-layer polypropylene film.

In particular, a three-layer coextruded, biaxially oriented film structure was prepared, wherein the film structure comprised a propylene homopolymer base layer, a MDPE outer layer on one side of the base layer, and a high-gloss propylene homopolymer outer layer on the side of the base layer opposite the MDPE outer layer.

A 15 μm layer of FL01418, which is an ethylene-vinyl acetate copolymer (melt index=14 g/10 minutes (ASTM D1238) (melt index correlated from melt flow rate measurement at 190° C. according to the following: log(melt index)= 0.9394+0.9174*(log(melt flow rate))); 18 wt % vinyl acetate) available from ExxonMobil Chemical Co. under the trademark ESCORENE ULTRA, was coated onto the MDPE outer layer via an off-line coating process.

The conventional three-layer polypropylene film was also coated (off-line on a commercial production line) with a 15 μm layer of FL01418, but the receiving layer of the three-layer polypropylene film was first primed with a water-based primer.

An adhesion peel strength test was performed on both coated film structures according to ASTM D1876. At a peel speed of 50 mm/min, the coated film structure according to an embodiment of the invention, comprising a MDPE layer but no primer layer, achieved an adhesion peel value of 1.35 N/mm. In contrast, at the same 50 mm/min peel speed, the coated conventional three-layer film (primer layer, no ethylene-containing receiving layer) achieved an adhesion peel value of 0.9 N/mm.

In addition to possessing improved adhesion peel strengths, it must be noted that film structures according to this embodiment of the invention also eliminate the need for primer layers, which can be expensive.

What is claimed is:

1. A coextruded, biaxially oriented film structure comprising a base layer comprising a thermoplastic polymer and a first outer layer comprising a thermoplastic polymer that has a melting point of not more than 230° F. (110° C.) characterised in that:
    a) the thermoplastic polymer of the base layer is an isotactic propylene homopolymer having an isotacticity of from 89 to 99%, a melting point of from 311° F. (155° C.) to 329° F. (165° C.) and a melt flow rate of from 0.5 to 15 g/10 minutes measured according to ASTM 1238, and
    b) the thermoplastic polymer of the first outer layer is selected from the group consisting of ethylene plastomers, ethylene-vinyl acetate copolymers, ethylene-acrylic acid copolymers or terpolymers and blends thereof,
the film structure being prepared by coextruding melts corresponding to each individual layer of the film structure through a die to form a coextruded film sheet and simultaneously biaxially orienting the coextruded film sheet on a line using linear motors that directly propel opposed pairs of tenter clips synchronously.

2. The film structure of claim 1, further comprising an intermediate layer on one side of the base layer and the first outer layer is on a side of the intermediate layer opposite the base layer.

3. The film structure of claim 2, wherein the intermediate layer comprises an ethylene polymer.

4. The film structure of claim 1, further comprising a second outer layer disposed on a side of the base layer opposite the first outer layer.

5. The film structure of claim 1, wherein the film structure has been oriented from 1.5 to 8 times in the machine direction and from 2 to 12 times in the transverse direction.

6. The film structure of claim 1, wherein at least one outer surface of the film structure has been surface-treated by one of corona discharge treatment, flame treatment and plasma treatment.

7. The film structure of claim 1, further comprising a coating applied on an outer surface of one side of the film structure opposite the first outer layer.

8. The film structure of claim 1, further comprising a metallized layer applied to an outer surface of a side of the film structure opposite the first outer layer.

9. The film structure of claim 1, wherein the first outer layer is heat-sealed to a substrate.

10. The film structure of claim 1, further comprising a substrate laminated to the first outer layer of the film structure.

11. A coextruded, biaxially oriented film structure comprising a base layer comprising a thermoplastic polymer and a first outer layer comprising a thermoplastic polymer that has a melting point of not more than 230° F. (110° C.) characterised in that:
    a) the thermoplastic polymer of the base layer is an isotactic propylene homopolymer having an isotacticity of from 89 to 99%, a melting point of from 311° F. (155° C.) to 329° F. (165° C.) and a melt flow rate of from 0.5 to 15 g/10 minutes measured according to ASTM 1238, and
    b) the thermoplastic polymer of the first outer layer is selected from the group consisting of ethylene plastomers, ethylene-vinyl acetate copolymers, ethylene-acrylic acid copolymers or terpolymers and blends thereof, the film structure being prepared by coextruding melts corresponding to each individual layer of the film structure through a die to form a coextruded film sheet and simultaneously biaxially orienting the coextruded film sheet on a line using linear motors that directly propel opposed pairs of tenter clips synchronously, and
wherein the film structure has been oriented from 1.5 to 8 times in the machine direction and from 2 to 12 times in the transverse direction.

12. The film structure of claim 11, wherein at least one outer surface of the film structure has been surface-treated by one of corona discharge treatment, flame treatment and plasma treatment.

13. The film structure of claim 11, further comprising a coating applied on an outer surface of one side of the film structure opposite the first outer layer.

14. The film structure of claim 13, further comprising a metallized layer applied to an outer surface of a side of the film structure opposite the first outer layer.

15. The film structure of claim 11, wherein the first outer layer is heat-sealed to a substrate.

16. The film structure of claim 11, further comprising a substrate laminated to the first outer layer of the film structure.

17. A coextruded, biaxially oriented film structure comprising a base layer comprising a thermoplastic polymer and a first outer layer comprising a thermoplastic polymer that has a melting point of not more than 230° F. (110° C.) characterised in that:
  a) the thermoplastic polymer of the base layer is an isotactic propylene homopolymer having an isotacticity of from 89 to 99%, a melting point of from 311° F. (155° C.) to 329° F. (165° C.) and a melt flow rate of from 0.5 to 15 g/10 minutes measured according to ASTM 1238, and
  b) the thermoplastic polymer of the first outer layer is selected from the group consisting of ethylene plastomers, ethylene-vinyl acetate copolymers, ethylene-acrylic acid copolymers or terpolymers and blends thereof, the film structure being prepared by coextruding melts corresponding to each individual layer of the film structure through a die to form a coextruded film sheet and simultaneously biaxially orienting the coextruded film sheet on a line using linear motors that directly propel opposed pairs of tenter clips synchronously, wherein the film structure has been oriented from 1.5 to 8 times in the machine direction and from 2 to 12 times in the transverse direction, wherein at least one outer surface of the film structure has been surface-treated by one of corona discharge treatment, flame treatment and plasma treatment.

18. The film structure of claim 17, further comprising a coating applied on an outer surface of one side of the film structure opposite the first outer layer.

19. The film structure of claim 17, further comprising a metallized layer applied to an outer surface of a side of the film structure opposite the first outer layer.

20. The film structure of claim 17, wherein the first outer layer is heat-sealed to a substrate.

* * * * *